United States Patent [19]

Luthy

[11] 4,039,004
[45] Aug. 2, 1977

[54] BACKFLOW VALVE MOUNTING AND SEALING DEVICE

[75] Inventor: Ronald K. Luthy, Garden Grove, Calif.

[73] Assignee: West American Rubber Co., Orange, Calif.

[21] Appl. No.: 621,754

[22] Filed: Oct. 14, 1975

[51] Int. Cl.² .............................................. F16K 15/03
[52] U.S. Cl. .................................. 137/527; 137/527.8
[58] Field of Search .................. 137/527, 527.2, 527.4, 137/527.6, 527.8; 251/147

[56] References Cited

U.S. PATENT DOCUMENTS

| 604,117 | 5/1898 | Latshaw | 137/527 X |
| 1,619,033 | 3/1927 | Perrenot | 137/527.8 X |
| 1,837,658 | 12/1931 | Force et al. | 137/527.6 |
| 2,947,321 | 8/1960 | Kovalcik | 137/527.6 X |
| 3,292,658 | 12/1966 | Scaramucci | 137/527.2 X |

*Primary Examiner*—William R. Cline
*Attorney, Agent, or Firm*—Fulwider, Patton, Rieber, Lee & Utecht

[57] ABSTRACT

A resilient elastomer mounting and sealing device for a backflow valve. The backflow valve is positioned within a pipe fitting and includes a flapper element. The device serves to support the valve within the pipe fitting while sealing the valve relative to the pipe fitting and additionally provides a seat for the flapper element of the valve.

4 Claims, 4 Drawing Figures

U.S. Patent  Aug. 2, 1977  4,039,004
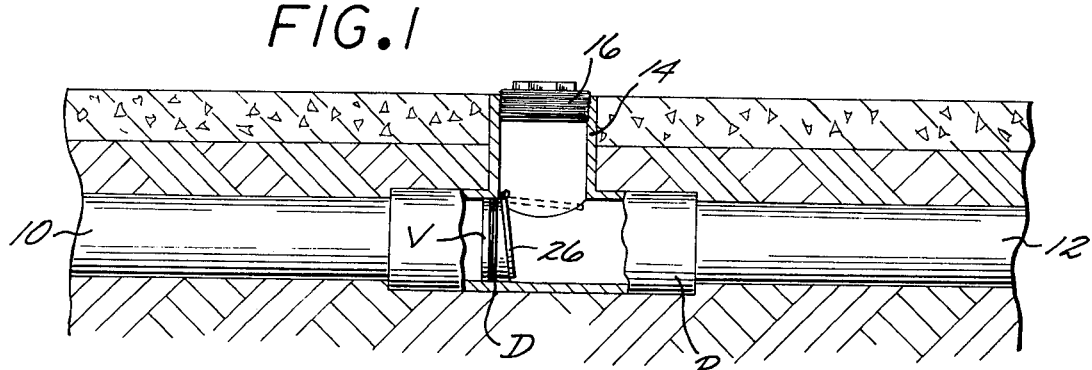
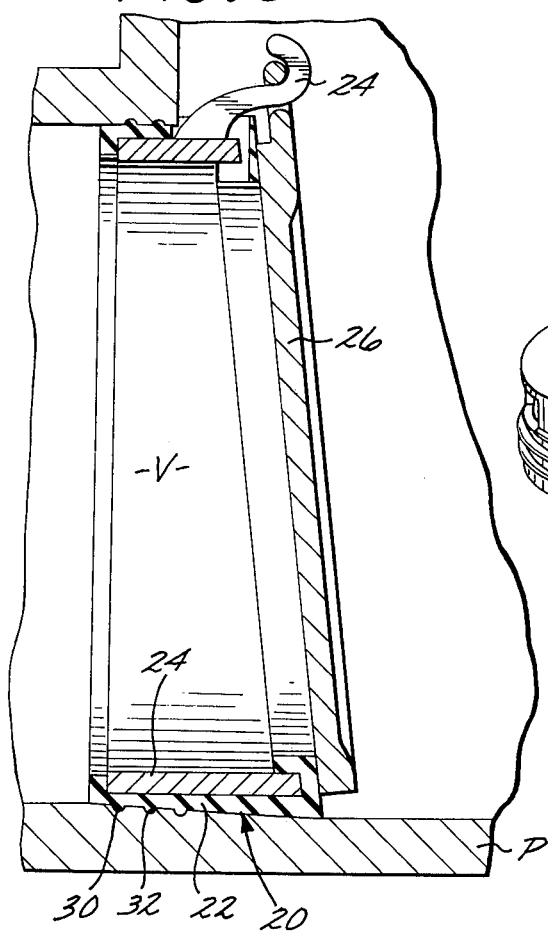
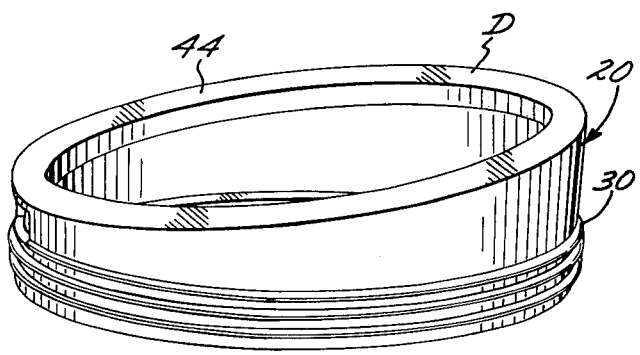
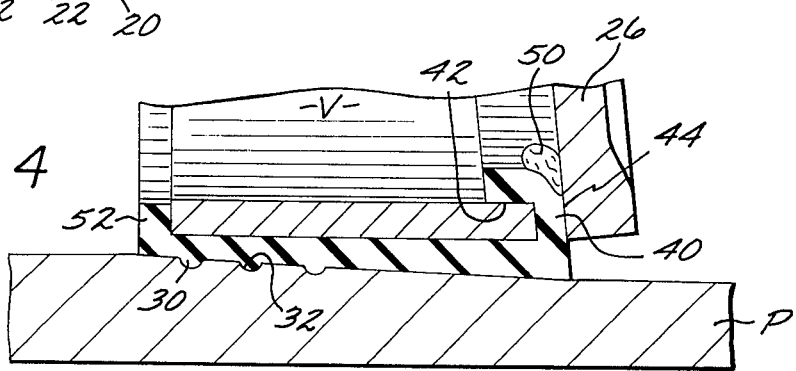

BACKFLOW VALVE MOUNTING AND SEALING DEVICE

BACKGROUND OF THE INVENTION

1. Field of the Invention

The present invention relates generally to pipe fittings, and more particularly to a resilient combination mounting and sealing device for supporting a backflow valve in a pipe fitting.

2. Description of the Prior Art

It has heretofore been common practice to mount a backflow valve within a pipe fitting by means of lead and oakum. Such lead and oakum installations frequently break loose, requiring replacement of the valve mounting at considerable expense, particularly where the pipe fitting is difficult to reach.

SUMMARY OF THE INVENTION

It is a major object of the present invention to provide an improved arrangement for mounting and sealing a backflow valve in a pipe fitting.

It is another object of the present invention to provide a combination backflow valve mount and seal which permits rapid and ready replacement of backflow valves.

It is yet a further object of the present invention to provide a mounting and sealing device of the aforedescribed nature which in addition to providing means for mounting and sealing a backflow valve within a pipe fitting, also serves as a seat for the flapper valve element of the backflow valve.

Yet a further object of the present invention is to provide a backflow valve mounting and sealing device of the aforedescribed nature which is simple of construction, economical of manufacture and capable of providing a long and trouble-free service life.

These and other objects and advantages of the present invention will become apparent from the following detailed description.

DESCRIPTION OF THE DRAWINGS

FIG. 1 is a broken side elevational view of a preferred form of backflow valve mounting and sealing device installed in a conventional backflow system;

FIG. 2 is a perspective view of said backflow valve mounting and sealing device;

FIG. 3 is a central vertical sectional view showing said mounting and sealing device as arranged in operative position within a pipe fitting; and FIG. 4 is an enlarged central vertical sectional view of the lower portion of FIG. 3.

DESCRIPTION OF THE PREFERRED EMBODIMENT

Referring to the drawings, and particularly FIG. 1 thereof, there is shown a preferred form of mounting and sealing device D for a backflow valve V installed in a generally T-shaped fitting P of a conventional buried backflow system. The upstream end of the pipe fitting P is conventionally connected to an upstream pipe 10, while the downstream end of such pipe fitting is conventionally connected to a downstream pipe 12. The pipe fitting P includes an upstanding neck 14 which is normally closed by a conventional threaded cap 16.

Referring now to the remaining drawings, the mounting and sealing device D is formed of a suitable conventional resilient elastomer, such as a vulcanizable natural or synthetic Polymer. Device D includes an annular main body, generally designated 20, which as indicated particularly in FIG. 3 encompasses the exterior surface 22 of the cylindrical mounting portion 24 of metallic backflow valve V. Backflow valve V is provided at its upper central portion with an integral hook 24 which hingedly supports the upper end of the flapper element 26 of such valve V. Main body 22 is formed with a cutout 27 to accommodate the hook 24. It should be understood that backflow valve V is of conventional construction. It should also be noted that the cylindrical mounting portion 24 of valve V is of generally trapezoidal configuration with its lower portion being longer than its upper portion.

The main body of the mounting and sealing device D is integrally formed on its exterior periphery with a plurality of annular ribs 30 which are disposed within complementary grooves 32 formed on the inner walls of pipe fitting P. These ribs 30 are snugly received by the grooves 32 so as to removably support the mounting portion 24 of backflow valve V within the pipe fitting P. Ribs 30 also form a liquid-tight seal between the exterior of the valve mounting portion 24 and the interior of the pipe fitting P. It will be understood that the utilization of the rib and groove arrangement permits the backflow valve V and/or the mounting and sealing device D to be readily replaced by means of the neck 14 of pipe fitting P.

Referring again to FIGS. 3 and 4, the downstream end of the main body 22 is integrally formed with a radially inwardly extending lip 40 having an annular recess 42 that receives the downstream end of the valve mounting portion 24. The downstream surface 44 of the lip 40 serves as a seat for the flapper valve element 26. This seat is self-adjusting with respect to any discontinuities in the upstream surface of the flapper valve element 26. Moreover, the provision of such resilient seat permits the flapper valve element 26 to effect a seal even where foreign material may come into contact with such seat. In this regard, as indicated in FIG. 4, should foreign material 50 become lodged between the seating surface 44 of the lip 40 and the downstream end of the flapper valve element 26, the resilient material of the mounting and sealing device D would indent or deflect sufficiently that the flapper valve element 26 could still effect a seal relative to the lip 40. The upstream end of main body 22 is integrally formed with a radially inwardly extending flange 52 which abuts the upstream end of the valve mounting portion 24.

The material of device D is sufficiently pliable that it can be readily applied to and removed from the backflow valve V. Moreover, such device D is seen to be of simple and economical construction. It is readily mounted in and removable from a pipe fitting utilizing a minimum amount of time and labor.

Various modifications and changes may be made with respect to the foregoing detailed description without departing from the scope of the present invention.

I claim:

1. A mounting and sealing device for supporting a backflow valve in a pipe fitting, said backflow valve having a cylindrical mounting portion telescopically received within said pipe fitting, with one end of said cylindrical mounting portion serving as a valve seat for a flapper element that is carried by said one end of said mounting portion, and the pipe fitting being formed with circumferential grooves, said mounting and sealing device being of resilient material and comprising:

an annular main body that telescopically encompasses the exterior surface of the mounting portion of said valve and fills the space between said exterior portion and the adjoining portion of the pipe fitting;

said main body being formed on its exterior periphery with annular ribs that are snugly received by the grooves of said pipe fitting to removably support the mounting portion of said valve within said pipe fitting while forming a seal between said valve mounting portion and the interior of said pipe fitting; and one end of said main body being formed with a radially inwardly extending lip that receives said one end of the mounting portion of the valve so as to form a seat for said flapper element.

2. A mounting and sealing device as set forth in claim 1 wherein:

the end of said main body opposite said lip is formed with a radially inwardly extending flange that abuts the opposite end of the mounting portion of said valve.

3. A mounting and sealing device for supporting a backflow valve in a pipe fitting, said backflow valve having a cylindrical mounting portion telescopically received within said pipe fitting, with the downstream end of said cylindrical mounting portion serving as a valve seat for a flapper element that is carried by said downstream end of said mounting portion, and the pipe fitting being formed with circumferential grooves, said mounting and sealing device being of resilient material and comprising:

an annular main body that telescopically encompasses the exterior surface of the mounting portion of said valve and fills the space between said exterior portion and the adjoining portion of the pipe fitting;

said main body being formed on its exterior periphery with annular ribs that are snugly received by the grooves of said pipe fitting to removably support the mounting portion of said valve within said pipe fitting while forming a seal between said valve mounting portion and the interior of said pipe fitting; and the downstream end of said main body being formed with a radially inwardly extending lip that receives said downstream end of the mounting portion of the valve so as to form a resilient seat for said flapper element.

4. A mounting and sealing device as set forth in claim 3, wherein:

the upstream end of said main body is formed with a radially inwardly extending flange that abuts the upstream end of the mounting portion of said valve.

* * * * *